United States Patent [19]

Allison, III

[11] Patent Number: 4,618,433

[45] Date of Patent: Oct. 21, 1986

[54] DRILLING FLUIDS AND THINNERS THEREFOR

[75] Inventor: George M. Allison, III, Bartlesville, Okla.

[73] Assignee: Phillips Petroleum Company, Bartlesville, Okla.

[21] Appl. No.: 636,054

[22] Filed: Jul. 30, 1984

[51] Int. Cl.$^4$ ............................................. C09K 7/02
[52] U.S. Cl. ............................... 252/8.514; 252/8.51; 252/8.511
[58] Field of Search .............. 252/8.5 A, 8.5 B, 8.5 C, 252/8.5 P

[56] References Cited

U.S. PATENT DOCUMENTS

| | | | |
|---|---|---|---|
| 2,450,936 | 10/1948 | Cardwell | 252/8.5 |
| 2,551,355 | 5/1951 | Weiss | 252/8.5 |
| 2,605,221 | 7/1952 | Hoeppel | 252/8.5 |
| 2,724,696 | 11/1955 | Ratcliffe | 252/8.5 |
| 2,759,891 | 8/1956 | Rohrback et al. | 252/8.55 |
| 3,117,141 | 4/1965 | Brukner et al. | 252/8.5 |
| 3,171,810 | 3/1965 | King et al. | 252/8.5 |
| 3,177,142 | 4/1965 | Brukner et al. | 252/8.5 |
| 3,278,425 | 10/1966 | King et al. | 252/8.5 |
| 3,344,063 | 9/1967 | Stratton | 252/8.5 |
| 3,410,797 | 11/1968 | Walker et al. | 252/8.5 |
| 3,479,287 | 11/1969 | Floyd et al. | 252/8.5 |
| 3,506,572 | 4/1970 | Van Dyke et al. | 252/8.5 |
| 3,956,142 | 5/1976 | Wilson et al. | 252/8.5 |
| 4,110,231 | 8/1978 | Swanson | 252/8.5 |
| 4,311,600 | 1/1982 | Firth | 252/8.5 |

OTHER PUBLICATIONS

Fowkes et al., "Leonardite: A Lignite Byproduct", U.S. Bureau of Mines, Report of Investigations 5611, 1960.
Encyclopedia of Chemical Technology, Kirk-Othmer, 3rd edit., vol. 17, pp. 143-166.
Journal of Petroleum Technology, Oct., 1971, pp. 1193-1201.
Oil & Gas Journal, Jul. 4, 1983, pp. 71-78, Sikorski & Weintritt.

*Primary Examiner*—Herbert B. Guynn
*Attorney, Agent, or Firm*—Paul S. Chirgott

[57] ABSTRACT

In an aqueous drilling fluid, an improved thinning effect is obtained by adding a first agent comprising a sulfoalkylated tannin or heavy metal complex thereof, optionally in combination with a lignite, and a second agent comprising a metal compound containing tin, optionally in combination with a metal compound containing nickel or manganese, and wherein said metals can be present in the cation and/or anion portion of said metal compound.

17 Claims, No Drawings

DRILLING FLUIDS AND THINNERS THEREFOR

This invention relates to drilling fluids and additives therefor. In one aspect this invention relates to drilling fluids having improved viscosity or other rheological characteristics. In another aspect this invention relates to additives for drilling fluids, which additives when incorporated in a drilling fluid impart a thinning effect and/or improved viscosity or other rheological characteristics to said drilling fluid. In still another aspect this invention relates to improved processes for drilling wells.

BACKGROUND OF THE INVENTION

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place).

The drilling fluid preferably acts as a liquid medium of controlled viscosity for removing cuttings from the bore hole; it should prevent excessive amounts of fluid from flowing from the bore hole into surrounding formations by depositing on the wall of the hole a thin but substantially impervious filter cake; it preferably possesses a gel structure of sufficient strength to hold solids in suspension, particularly during any time the fluid is not circulating; and it should serve as a weighting material exerting sufficient pressure to counterbalance any pressure exerted by water, gas, oil, or other fluid from a penetrated structure and to prevent caving or other intrusion into the drill hole.

These preferred characteristics have been provided in the past by employing both aqueous or water base and non-aqueous or oil base drilling fluids. The aqueous drilling fluids normally comprise water and finely divided inorganic materials such as various types of clays and clayey materials, and may also contain weighting materials, all suspended in the water. The non-aqueous or oil base drilling fluids normally comprise a non-aqueous liquid such as crude oil or a petrolum distillate, and a weighting material which can be a clay or other suitable material. In addition to aqueous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

Various clays can be used in the various types of drilling fluids, but the most common are bentonite, a water-swelling clay preferred for use in fresh water fluids, and attapulgite, a non-swelling clay used in salt water fluids.

In the drilling of wells there are major difficulties caused by natural formations penetrated. One of these difficulties is the encountering of certain formation, such as gypsum, which will "cut" the drilling mud so that the clay particles are flocculated and the viscosity becomes too high. In such instances there is danger of the drill pipe twisting in half, or of gas cutting of the mud, or of a blowout occurring due to the cutting of the mud. Another difficulty is the encountering of formations known as heaving shale. A heaving shale absorbs water from the drilling mud and by a caving or disintegrating action common to clay and shale, or by a swelling action common to bentonite materials, the well hole is closed around the drill string, choking off the circulation of drilling mud and often seizing the drill string so that it cannot be rotated or twists in half. Another difficulty which is frequently encountered in deeper wells is gelation and/or thickening of the drilling mud due to the higher temperatures encountered in said deeper wells. This tendency to gel or thicken is most pronounced in muds containing water-swelling clays such as bentonite. In such instances the drilling mud actually gels and/or thickens, greatly increasing the pump pressures required for circulating the drilling mud. In severe cases it becomes practically impossible to properly circulate the mud. Furthermore, said high temperature gelation is frequently aggravated by the presence of contaminants such as gypsum, salt, cement, etc. in the drilling mud. Thus, another preferred characteristic for drilling muds is that they be characterized by stability at the higher temperatures encountered in deeper wells and in the presence of contaminants.

Various drilling fluid additives have been developed to prevent or remedy such problems. Hoeppel discloses in U.S. Pat. No. 2,605,221 (1948) the control of the viscosity and gel strength of drilling fluids by the addition of a compound the cation of which is a normally flocculating heavy-metal ion such as manganese, nickel or tin, and a non-acid-forming normally deflocculating peptizing compound such as a tannate or humate. Sulfoalkylated tannins are not disclosed, nor are mixtures of lignite and sulfoalkylated tannins. Floyd and Shell disclose in U.S. Pat. No. 3,479,287 (1969) drilling fluid additives containing a first agent of a sulfoalkylated tannin and a second agent selected from water soluble inorganic compounds of chromium, aluminum, vanadium, titanium, zinc and manganese, said agents being added to control at least one of the properties yield point, gel strength and water loss of a drilling fluid. One such additive, a physical blend of sulfomethylated quebracho and sodium dichromate dihydrate ($Na_2CrO_3.2H_2O$), has been marketed successfully as Desco ® drilling mud thinner by Drilling Specialties Company, Bartlesville, Okla. 74004. However, due to the rising costs of quebracho and the sulfoalkylation process and the fact that quebracho is an essentially nonrenewable resource obtained from a single country (Argentina), it is desirable to find equivalent raw materials which are more effective and/or less costly and are readily available in quantity. Furthermore, chromates are on the hazardous substance list of the Environmental Protection Agency. Several countries have prohibited the use of chromium compounds in drilling muds. Other areas, notably the Canadian Arctic and California, have stringent rules as to the use and disposal of drilling muds containing chromium compounds. Therefore, it is desirable to develop additives containing equally effective and economical materials which are non-hazardous and/or not subject to restrictive regulations.

The apparent viscosity or resistance to flow of drilling muds is the result of two properties, plastic viscosity and yield point. Each of these two properties represents a different source of resistance to flow. Plastic viscosity is a property related to the concentration of solids in the fluid, whereas yield point is a property related to the interparticle forces. Gel strength, on the other hand, is a property that denotes the thixotropy of mud at rest. The yield point, gel strength, and, in turn, the apparent viscosity of the mud, commonly are controlled by chemical treatment with materials such as complex phosphates, alkalies, mined lignites, plant tannins, and modified lignosulfonates.

Reducing the viscosity of a drilling fluid suggests a thinning action. Materials used to accomplish this thinning action are called "thinners" and in particular "mud thinners." This thinning action can result from reducing the plastic viscosity, the yield point, the rate and degree of gelation, or a combination of any of the three effects. It is usually very difficult to vary any one of the effects without affecting either or both of the others.

Thinners in drilling muds are thought to act to oppose the development of gel structure without substantially altering the hydration of the clays. Thinners generally have, as a common characteristic, a large negative ion. These large anions are thought to be absorbed on the edge surfaces of the clay particles and reduce attractive forces between the particles, thereby decreasing the tendency of the particles to form a gel structure. Thinners usually have a small effect on the plastic viscosity of water-base drilling fluids.

Plant tannins are effective thinners of freshwater-base drilling fluids as well as those treated or contaminated mildly with salt, cement, lime, and gypsum. Quebracho continues to be the most widely used member of this group, because it is generally more versatile and economical to use.

Lignitic materials, which are resistant to salt and cement contaminations, effectively emulsify oil in high percentages and are especially stable in drilling muds at high temperatures. Lignitic materials are becoming increasingly important to impart high-temperature stability to drilling muds thinned with lignosulfonates.

Lignosulfonate thinners are made from the spent cooking-liquor by-product of the manufacture of cellulose pulp by the sulfite process. Basic calcium lignosulfonates are precipitated from liquor. Calcium lignosulfonate is useful as a thinner for lime-treated muds and saturated saltwater-emulsion muds. Ferrochrome lignosulfonate is used as a thinner for "inhibited" drilling muds. It performs effectively in drilling muds containing salt or calcium sulfate, not only controlling the rheological properties, but also reducing the filtrate loss.

Contaminants bring about undesirable increases in viscosities, gel strengths, and filtrate losses in waterbase drilling fluids. The typical contaminants, listed in order of decreasing frequency, are cement, salt, anhydrite, hydrochloric acid, and hydrogen sulfide. One method of counteracting the effects of such contaminants is to treat the mud with a chemical that compensates or overcomes the detrimental effects caused by the contaminant; eg, when drilling mud is contaminated mildly with salt, treat with an alkalized tannin, lignitic material, or ferrochrome lignosulfonate.

OBJECTS OF THE INVENTION

An object of this invention is to provide an improved drilling fluid. Another object of this invention is to provide an improved drilling fluid having enhanced viscosity of other rheological characteristics. Another object of this invention is to provide improved aqueous drilling fluids which are characterized by stability to the high temperatures encountered in drilling deep wells.

Another object of this invention is to provide new additives for use in aqueous drilling fluids, e.g. water base drilling fluids and oil-in-water emulsion drilling fluids, which additives will impart improved viscosity or other rheological characteristics, such as thinning effects, to said drilling fluids without hazarding the environment. Another object of this invention is methods of using said improved drilling fluids in the drilling or workover of wells. Other aspects, objects, and advantages of the invention will be apparent to those skilled in the art in view of this disclosure.

SUMMARY OF THE INVENTION

I have now discovered a new class of additives for drilling fluids, which additives when incorporated in aqueous drilling fluids, i.e., water base drilling fluids and oil-in-water emulsion drilling fluids, impart improved viscosity or other rheological characteristics, particularly "thinning" action, to said drilling fluids. Said new additives are combination additives comprising a first additive agent comprising an organic material as defined below, and a second additive agent selected from compounds of certain metals that form complexes through utilization of "d" orbitals, as listed below.

Thus, broadly speaking, the present invention resides in said new additives; drilling fluids containing one or more of said new additives; and methods of using said drilling fluids in the drilling of wells.

According to the invention, there is provided an aqueous drilling fluid comprising water and finely divided solids, to which there has been added: a first agent comprising a tannin selected from the group consisting of (1) sulfoalkylated tannins and (2) heavy metal complexes of sulfoalkylated tannins wherein said metal is selected from the group consisting of iron, copper, chromium, nickel, cobalt, manganese, zinc, aluminum, titanium, vanadium, and mixtures thereof; and a second agent comprising a metal compound selected from the group consisting of cationic and anionic compounds of tin, optionally in combination with at least one similar compound of nickel and/or manganese. The weight ratio of said first agent to said second agent can be within the range of from about 100:1 to about 1:1 and the total amount of said first agent and said second agent added to said drilling fluid should be an amount sufficient to reduce at least one of (a) the plastic viscosity (b) the yield point, (c) the 10-second and/or 10-minute gel strength of said drilling fluid and (d) the high temperature shear strength and gel strength.

In one embodiment, the sulfoalkylated tannin or metal complex thereof can be used in combination with a lignite, producing a cheaper product of equivalent effectiveness. In this embodiment, the metal compound of the second agent can be selected from the group consisting of the compounds of tin, nickel and manganese described above, and in more detail below.

Further according to the invention, there are provided methods of using the improved well drilling fluids of the invention, which methods comprise circulating said well drilling fluids into and from the bore hole in contact with the wall of said bore hole.

Still further according to the invention, there is provided a drilling fluid additive comprising a mixture of a first agent selected from the group consisting of (1) sulfoalkylated tannins and (2) metal complexes of sulfoalkylated tannins wherein said metal is selected from the group consisting of iron, copper, chromium, nickel, cobalt, manganese, zinc, aluminum, titanium, vanadium, and mixtures thereof, optionally in combination with a lignite; and a second agent comprising a metal compound selected from the group consisting of the cationic and anionic compounds of tin, nickel and/or optionally in combination with at least one similar compound of manganese; the weight ratio of said first agent to said second agent in said additive being within the range of from about 100:1 to about 1:1.

It will be noted that the drilling fluid additives of the invention are combination additives, i.e., said additives comprise a mixture of first additive agent and a second additive agent which cooperate to obtain the improved result of the invention. Said combination additives cooperate in a synergistic manner to impart reduced yield point values and reduced gel strength values, or other improved rheological properties, described as "thinning" action, to a drilling fluid having the combination additive incorporated therein. The synergistic effects obtained when said additive agents of the combination additive of the invention are used in combination are discussed further hereinafter in connection with the specific examples.

DETAILED DESCRIPTION OF THE INVENTION

Tannins

Said first additive agent of the combination additive can be either a sulfoalkylated tannin or one or more of certain metal complexes of a sulfoalkylated tannin, or mixtures of either of these with a lignite, as described herein. The sulfoalkylated tannins, e.g., sulfomethylated quebracho, are presently preferred for use as said first additive agent.

Tannins which can be used in preparing the sulfoalkylated tannins and the metal complexes of sulfoalkylated tannins used in the practice of the invention are the vegetable tannins, including both the gallotannins and the flavotannins (sometimes called catechol tannins). Thus, the word "tannin" as used herein and in the claims, unless otherwise specified, refers to and includes the vegetable gallotannins and the vegetable flavotannins. Examples of the gallotannins include: tannic acid or Chinese tannin; Turkish tannin; Hamamelis tannin; Acer-tannin; Glucogallin; Sumac tannin; Valonia oak gall tannin; tea tannin; and tannins of Tara, Myrabolam, Divi-Divi, Algarobillo, oak, and chestnut. Examples of flavotannins include tannins from Gambier and catechu or Burma Cutch, quebracho, Tizerah, Urunday, wattle, mangrove, spruce, hemlock, larch, willow, pecan shells and Avaram. Said flavotannins are the presently preferred tannins for use in accordance with the invention.

Quebracho is presently the most preferred tannin. Quebracho is extracted from the bark and wood of the quebracho tree with water. The conventional method of preparing quebracho is to disintegrate the wood and bark, extract the bark and/or wood with water, after which the solution of quebracho and water is evaporated to about an 85 percent concentration of quebracho and the concentrated quebracho is spray dried. Quebracho is the commercial catechol tannin or flavotannin product. The high tannin content (about 20 percent) of the wood of the quebracho tree makes it the most important source of catechol tannins. The principal source of gallotannins is gall nuts. Since quebracho is extracted from mature trees which are found primarily in Argentina and have been harvested faster than they can be renewed, substitutes for this substance or means for increasing its effectiveness are desirable.

As indicated above, the sulfoalkylated tannins, e.g., sulfomethylated quebracho (commonly abbreviated "SMQ"), are presently preferred for use as the first agent in the combination additives of the invention. As will be understood by those skilled in the art in view of this disclosure, the following description of methods (including reaction conditions) for preparing metal complexes of sulfoalkylated tannins also applies to the preparation of the sulfoalkylated tannins. The only difference is that no complexing metal reagent is used.

The metal complexes of sulfoalkylated tannins which can also be used as the first agent in the additives of the invention are preferably those which are soluble in the water phase of the drilling fluid. However, as discussed further hereinafter, the invention is not limited to the metal complexes of sulfoalkylated tannins which are completely soluble in water; it is sufficient if said metal complexes can be readily dispersed in the water phase of the drilling fluids in any suitable manner. Said metal complexes per se, methods for preparing same, and drilling fluid compositions containing the same, are disclosed by Stratton in U.S. Pat. No. 3,344,063, issued Sept. 26, 1967.

Examples of metal compounds which can be used as the complexing metal reagent in the preparation of said metal complexes, include, among others, the water-soluble salts such as the nitrate or chloride, and the hydroxides or hydrated oxides of iron, copper, chromium, nickel, cobalt, manganese, zinc, aluminum, titanium, and vanadium. Generally speaking, the water-soluble salts are preferred. However, the hydrated oxides or hydroxides of said metals are sometimes preferred compounds because they contain no anions such as chloride or nitrate which would be left in the reaction mixture when the cation is complexed with the tannin. Another preferred class of metal-containing compounds which can be used are the ammonium and the alkali metal salts of the above metals wherein the said above metals are present in the anion portion of the molecule, e.g., the alkali metal chromates, vanadates, titanates, manganates, etc., and the alkali metal dichromates. As used herein, unless otherwise specified, the term alkali metal is employed generically to include sodium, potassium, lithium, rubidium, cesium, and ammoniium. When an object is the exclusion of chromium or other toxic metals from the drilling fluid or additive, the metal compounds should be chosen accordingly.

The use of such metal compounds as complexing metal reagents with the sufoalkylated tannins is to be distinguished from the use of certain similar metal compounds as an additive agent in conjunction with sulfoalkylated tannins or metal complexes thereof, as disclosed by Floyd and Shell in U.S. Pat. No. 3,479,287 (1969).

The metal complexes of sulfoalkylated tannin, either a gallotannin or a flavotannin, can be prepared by several different procedures. All of said procedures involve the inter-reaction, in an alkaline aqueous reaction medium under reaction conditions, between a tannin, a carbonyl compound selected from the group consisting of aldehydes and ketones, a sulfur compound selected from the group consisting of the hydrated oxides or hydroxides, and a metal compound selected from the water-soluble salts of iron, copper, chromium, nickel, cobalt, manganese, zinc, aluminum, titanium, and vanadium. In all cases, the effect is to alkylate the tannin molecules with at least one $-C(R)_2-SO_3M$ side chain, wherein each R is selected from the group consisting of hydrogen and alkyl radicals containing from 1 to about 5 carbon atoms and M is selected from the group consisting of ammonium and the alkali metals. The reagents can be controlled so that the tannin is only partially sulfoalkylated.

If desired, the metal can be complexed with the tannin compound first. In this method, the metal compound is added to an alkaline solution of the tannin to form the metal complex of said tannin. Said metal complex is then sulfoalkylated by adding the carbonyl compound and sulfite, either prereacted or not reacted, to the solution of the metal complex of the tannin to sulfoalkylate said metal complex and form a metal complex of sulfoalkylated tannin.

Further details of the preparation of sulfoalkylated tannins and metal complexes thereof are provided in U.S. Pat. No. 3,479,287, columns 5–9, which disclosure is hereby incorporated by reference.

Lignites

In one embodiment of the invention, an amount of up to about 90 percent by weight of the first additive agent (the sulfoalkylated tannin or metal complex thereof) can be diluted or replaced by a lignite or lignite by-product, which are generally cheaper materials, without degrading the performance of the additive. The lignite is preferably added to the tannin material after the sulfoalkylation and metal complexing operations have been carried out. Since the equivalent weight of sulfoalkylated tannin is greater than that of the untreated tannin (e.g., about 190 pounds of sulfomethylated quebracho are equivalent to 100 pounds of untreated quebracho), the proportion of tannin to be combined with the lignite is based upon the weight of the sulfoalkylated tannin. In other words, the weight proportion of sulfoalkylated tannin to said lignite can be in the range of from about 10:90 to about 99:1.

Any suitable lignite or lignite by-product can be used in this invention. Lignitic materials which are high in humic acids, thus readily soluble in basic solution, are preferred. Presently preferred is a special type of lignite or lignite by-product, such as leonardite, which is characterized by its high oxygen content and increased alkali solubility. Leonardite is a soft, earthy, medium brown, coal-like substance associated with lignitic outcrops in North Dakota, South Dakota, Montana and Texas, and is mined commercially. Normal lignite may be converted to a material of similar properties by oxidation and such converted lignite may be used in the preparation of the compositions of this invention. Leonardite has an oxygen content higher than that of other types of lignite, about 28 percent to 29 percent oxygen as compared to 19 percent to 20 percent oxygen in lignite. The higher oxygen content of leonardite is due to the larger number of carboxylic acid groups, which may explain the great increase in alkali solubility of leonardite as compared to lignite. Infrared studies indicate that the material contains mixed salts of humic acids.

There are three types of leonardite. Type one is a black colloidal material that swells to several times its original volume in water and dissolves in alkali hydroxides, leaving almost no residue. It is analogous to what has been described as native humus acid and gives dark brown, rich-colored solutions of alkali, and may be precipitated as a light brown colloid with acids at a pH of four or lower. Type two is a mixture of type one leonardite and lignites. Type two is found wherever a lignite seam is overlaid with less than eight feet of water permeable sandy sediment. Type three leonardite resembles the laboratory precipitated product from type one and is a fine grained colloidal material and is intimately intergrown with gypsum. All three types may be used in this invention.

For further detailed information on leonardite, see Fowkes and Frost, "Leonardite: A Lignite Byproduct," U.S. Bureau of Mines Report of Investigations 5611 (1960). Leonardite is available commercially as Tannathin ® lignite, from Magcobar Operations, Oil Field Products Group, Dresser Industries, Inc., of Houston, Tex.

The solubility of lignitic materials is easily determined by preparing a stock solution of two and one-half percent caustic soda. Ten grams of the dried and powdered lignitic material are contacted with enough two and one-half percent caustic solution to bring the volume of the sample to 100 cc. The sample is thoroughly mixed by mechanical action. The mixture is then centrifuged for five minutes at 1500 r.p.m., after which the liquid portion is decanted. The residue or the material at the bottom of the centrifuge tube is again contacted with two and one-half percent caustic soda solution to return the volume to 100 cc. This is again followed by agitation, centrifugation, and decantation. The entire procedure is then repeated a third time and following the third washing the residue is dried, weighed, and the percent insolubles is then calculated.

The solubility of leonardite is greater than that of conventional lignite. As an example, a typical solubility of conventional lignite is about 68 percent in alkali, whereas leonardite has a solubility of about 85 percent. All proportions herein are by weight. A typical leonardite having 85 percent solubility consists of 13.5 percent moisture, 71.5 percent humic acids, and 15 percent residue, whereas lignite of 67⅔ percent solubility may have an analysis of 15 percent moisture, 51.7 percent humic acid, and 33.3 percent residue.

Metal Compound Additives

The second additive agent comprises at least one of tin, nickel and/or manganese compound, salt or complex, generically referred to a "compound". Depending upon the chemistry of the compounds involved, the metal(s) used can be present in the cation and/or anion portions of the compounds. In certain preferred embodiments, two or more such metals can be combined in one compound, e.g. $NiSnO_3$, or the same metal can be present in both the cation and anion portions of a single compound, e.g. $MnMnO_4$.

Metal compounds which can be used in the second additive agent in the combination additive of the invention are various at least partially water-soluble compounds of tin, nickel and manganese, preferably the water-soluble cationic or anionic compounds of these metals, all of which form complexes by utilizing a "d"

orbital. As used herein and in the claims, unless otherwise specified, a cationic compound of a metal is defined as a compound wherein the metal is present in the cationic portion of the molecule and an anionic compound of a metal is defined as a compound wherein the metal is present in the anionic portion of the molecule. Examples of said cationic compounds include, among others, the simple salts of inorganic oxo-acids such as the nitrates, chlorides, iodides, bromides, fluorides, phosphates, sulfates, etc. of said metals. Also included are the double salts such as potassium manganese (II) chloride hexahydrate and sodium manganese (II) chloride, and anionic compounds such as the alkali metal, nickel or manganese stannates, stannites, manganates and permanganates. Mixtures of compounds of the same or different metals can be used. In addition to these inorganic metal compounds, water-soluble carboxylic acid salts of tin, nickel and manganese, such as the formates, acetates, propionates, acrylates, citrates and tartrates, can be used.

Based upon various tests, most of which are embodied in the examples herein, certain metal compounds are presently preferred for their proven performance under varied conditions, availability, economy and compatibility with drilling fluid systems. When used with bentonite-based aqueous drilling fluids, the tin compounds are presently preferred, with the halides, phosphates and sulfates as a group being the most effective in thinning such fluids. Based on the examples, the following compounds are listed in an approximate order of decreasing effectiveness, with $SnF_2$ being most effective:

$SnF_2$, $SnSO_4$ and $SnP_2O_7$, $SnCl_2$, $NiSnO_3$, $K_2SnO_3$, $Sn(BF_4)_2$, $SnCl_4$.

The stannous fluoride, $SnF_2$, and pyrophosphate, $SnP_2O_7$, are presently preferred because of their high effectiveness in thinning drilling fluids and the fact they can be obtained in large quantities. Stannous sulfate, $SnSO_4$, is also a preferred tin salt due to its effectiveness and availability. $SnSO_4$, potassium stannate, $K_2SnO_3$; and stannous fluoroborate, $Sn(BF_4)_2$, are widely used in the tin plating industry, and are available commercially. The stannous and stannic chlorides are preferably used in the hydrated forms, $SnCl_2.2H_2O$ and $SnCl_4.5H_2O$. Fuming stannous chloride, $SnCl_2$ (anhydrous), is available commercially, but is corrosive and could present handling problems While these selected tin salts have been found to perform well, any suitable compound of tin (II) or (IV) which is at least partially water-soluble can be used as the second additive agent in the drilling fluid additives of this invention. For example, any of the tin halides or mixed halides, anhydrous or hydrated, can be used, as can complexed compounds such as $SnCl_4.2NH_3$. Various tin phosphates can be used in addition to the pyrophosphate, provided they are at least partially water soluble. Various metal stannates and stannites which are at least partly water soluble can be used. Preferred metal compounds include stannates or stannites which contain at least one of the metals nickel or manganese in the cation portion of the molecule, e.g. $NiSnO_3$, or compounds containing tin in both the cation and anion, e.g. stannous stannate, $SnSnO_3$. Oxides or hydrous oxides of tin which are at least partially water soluble can also be used.

The metal compounds for use in the second additive agent should preferably be at least partially soluble in water, and their effectiveness under various drilling conditions will depend in part upon their solubility under ambient conditions. For example, when certain metal compounds are used to treat drilling fluids in conjunction with organic materials, the most soluble compounds may be faster-acting and more effective at relatively low temperatures, but the less soluble compounds may be more effective and persistent at elevated temperatures.

The tin compounds described above, used either alone or in conjunction with compounds of nickel and/or manganese, have been found to be much more effective per pound than the chromium compounds presently used as drilling fluid thinners, when such metal compounds are used in conjunction with organic materials such as sulfoalkylated tannins. Thus, although tin salts are presently more expensive than chromium compounds, their greater effectiveness generally makes them more cost effective additives. For example, an economical, effective and environmentally nonhazardous drilling fluid thinning additive can be prepared from tin salts and a mixture of sulfoalkylated tannin (e.g. SMQ) and lignite (preferably leonardite).

Any suitable nickel compound at least partially soluble in water can be used as the second additive agent in the additives of this invention, either alone or in admixture with tin or manganese compounds. Presently preferred are the halides, particularly the hydrated forms, which are more soluble. Nickel perchlorate, $Ni(ClO_4)_2.6H_2O$) and nickel formate $Ni(CHO_2)_2.2H_2O$, are also quite soluble. Nickel nitrate, nickel hypophosphite, nickel sulfate, and the naturally occurring hydrates of the sulfate can be used.

Suitable manganese compounds include the manganous halides, especially the chloride, with the various hydrates preferred. Manganous nitrate, $Mn(NO_3)_2.4H_2O$, manganous orthophosphate dihydrate $Mn(H_2PO_4)_2.2H_2O$, and the manganous hypophosphite, $Mn(H_2PO_2)_2.H_2O$, can be used. Also useful are the manganous and manganic sulfates, especially the various hydrates. Manganous salts of carboxylic acids such as the acetate or its tetrahydrate, $Mn(C_2H_3O_2)_2.4H_2O$, or the formate $Mn(CHO_2)_2.2H_2O$, can also be used. Metal manganates and permanganates can be used, preferably including one of the metals tin, nickel and manganese in the cation, e.g. $MnMnO_4$.

Synergistic thinning effects can be obtained by using compounds of tin and manganese, e.g. the halides, in combination, as shown in Example VII. Inorganic salts combining these metals, such as tin permanganate and nickel or manganese stannates or stannites, are also useful as the second agent of this invention.

Therefore, in the practice of this invention, manganese is preferably used in combination with tin, either as mixtures of compounds or in compounds combining these metals. The proportions of Mn to Sn can be in the range of from about 10:90 to about 90:10 parts by weight, or preferably from about 20:80 to about 80:20.

PROPORTIONS AND EMPLOYMENT OF COMBINATION ADDITIVES

In the combination additives of the invention the weight ratio of the first additive agent to the second additive agent is generally within the range of from about 100:1 to about 1:1, preferably within the range of from about 70:1 to 2:1. Frequently, a weight ratio within the range of from about 40:1 to 5:1 is more preferred.

The amount of the combination additives of the invention used in drilling fluids in accordance with the invention will vary from well to well depending upon conditions encountered in the drilling of the well, the characteristics of the particular drilling fluid being used, the formations being drilled, etc. For example, as the drilling of the well progresses and the well becomes deeper and temperatures in the well increase, or the drilling fluid becomes contaminated, more additive will usually be required because of said increased temperatures and/or contamination. While therefore the amount of additive used is not of the essence of the invention, it can be stated that the total amount of said combination additive used will normally be within the range of about 0.1 to about 30, preferably about 0.5 to about 20 and more preferably about 1 to about 10, pounds per barrel of drilling fluid. However, it is within the scope of the invention to employ amounts of the additive which are outside said ranges. For example, the amount of additive used will always be an amount which is sufficient to thin the mud and/or effect an improvement or reduction in the rheological properties of the drilling fluid such as a decrease in yield point, 10-minute and/or 10-second gel strength, or high temperature shear strength and gel strength. The terms "high temperature shear strength and gel strength" refer to tests carried out on samples which have been subjected to elevated temperatures, then cooled to room temperature, as explained in Example I and used by those skilled in the art. As used herein and in the claims, unless otherwise specified, the word "barrel" refers to a barrel of 42 standard U.S. gallons.

The type of drilling mud, type(s) of contamination and environmental conditions typically determine the severity of problems which require the use of additives for thinning action, as well as the extent of thinning action required. A simple fresh water mud can be thinned relatively easily, but contamination by cement, gypsum or salt (chloride ion) makes thinning more difficult, in approximate decreasing order of severity. Combinations of such contaminants are additive in their effects on thinning requirements, and elevated temperatures have a further strong influence, due to the tendency of many drilling fluids to gel at temperatures above about 150° F. (65° C.).

The combination additives of this invention are particularly effective in providing thinning action, or reducing at least one of the properties (a) the plastic viscosity (b) the yield point, (c) the 10-minute and/or 10-second gel, and (d) the high temperature shear strength and gel strength of drilling fluids contaminated with cement, gypsum or salt, and/or utilized at elevated temperatures, as shown by the examples herein.

An important advantage of the combination additives of the invention is the ease with which they can be dispersed in the water phase of aqueous drilling fluids. Said combination additives can be incorporated in said drilling fluids by merely adding same to a circulating stream of the drilling fluid. The components of said combination additives are easily pulverized solids which can be added directly as such or dry blended together, to the jet hopper commonly employed in formulating drilling fluids. The incorporation of said combination additives into the drilling fluid can be either before or during the drilling of the well. Dry blending of the first and second additive agents together in a proper weight ratio and then incorporating the resulting dry blend or mixture into a circulating stream of the drilling fluid is a presently preferred method for adding said additives to the drilling fluid. If desired, said additive agents can be added to the drilling fluid separately in dry form. Said first and second additive agents can also be dispersed in water separately and the resulting separate dispersions incorporated into the drilling fluid. However, it is pointed out that the first and second additive agents should not be dispersed in water together at high concentrations greater than about 50 pounds per barrel prior to incorporating same into the drilling fluid. When said additive agents are dispersed in water together at such high concentrations in the absence of finely divided solids such as clayey materials, a firm insoluble gel forms. Surprisingly, said gel is not formed when said additive agents are incorporated in the aqueous phase of a drilling fluid containing suspended finely divided solids such as clayey materials.

The combination additives of the invention can be used in a wide variety of aqueous drilling fluids, e.g., water base drilling fluids and oil-in-water emulsion drilling fluids. In some wells, particularly where hard limestone formations containing no shale or clay are being drilled, the drilling fluid can be water containing only a very small amount of finely divided inorganic solids such as clay solids. Many times, the drilling of a well is started with water as the drilling fluid. As the drilling progresses and shales or clay formations are penetrated, the circulating water will pick up natural clays and become what is commonly referred to as a drilling mud or drilling fluid. In such instances, the natural clays can constitute as much as 40 percent by weight of the drilling fluid. More frequently, however, it is desirable to prepare a drilling fluid which is to be used in the drilling by mixing a clayey material such as a natural clay or bentonite with water. If a drilling fluid is thus prepared, the concentration of the clayey material is usually lower, generally constituting from about 1 to about 25 weight percent of the entire composition. Thus, the drilling fluids of the invention in which the combination additives of the invention are utilized can contain only relatively small amounts of said clayey materials or can contain said clayey materials in amounts up to about 40 weight percent of the entire composition.

The finely divided inorganic solids used in the drilling fluids increase the viscosity and afford plastering properties to said fluids by aiding the formation of a filter cake on the wall of the bore hole and thus aid in reducing fluid loss to the formations penetrated by said bore hole. The finely divided inorganic solids used in the practice of the invention should be insoluble in the oil phase as well as insoluble in the water phase so that they will remain undissolved over long periods of time. Examples of finely divided solids suitable for use in the practice of the invention include, among others, the following: bentonite, ground limestone, barites, ground oyster shells, diatomaceous earth, fuller's earth, kaolin, attapulgite, McCracken clay, and other native and/or treated clays. Mixtures of two or more of said finely divided solids can also be used. Some of said materials such as barites and limestone are used primarily as weighting agents. All of said materials are preferably ground until at least about 9 percent will pass through a 325-mesh screen.

A preferred drilling fluid for some drilling operations is an oil-in-water emulsion drilling fluid. These drilling fluids can also contain clay or clayey materials in concentrations ranging from small amounts up to about 40 weight percent. Said oil-in-water emulsion drilling fluids are usually distinguished from water base drilling fluids by their content of from 5 to 40, preferably 5 to 25, weight percent of oil. However, both water base drilling fluids and oil-in-water emulsion drilling fluids are frequently referred to as aqueous drilling fluids because water forms the continuous phase in both. Thus, herein and in the claims, unless otherwise specified, the term "aqueous drilling fluid" is used generically and refers to both water base drilling fluid and oil-in-water emulsion drilling fluids.

In an oil-in-water emulsion drilling fluid the principal value of the oil is as an aid in controlling the density of the drilling fluid and its fluid loss properties. Oils which can be used in the practice of the invention are usually petroleum oils, although other oleaginous materials such as vegetable and animal oils can be used, though seldom with economic advantage. The oils in any event should contain at least some material boiling above the gasoline boiling range, i.e., above about 400° F. at atmospheric pressure. Oils with too high a content of highly volatile hydrocarbons in the gasoline boiling range are undesirable because of the danger of fire, and because of the low viscosity. It is preferred that the oil have a flash point above about 140° F. Examples of suitable oils which can be employed in the practice of the invention include, among others, the following: topped crude oil, gas oils, kerosene, diesel fuels, heavy alkylates, fractions of heavy alkylates, and the like. The more preferred oils are predominantly paraffinic in character, since these are less detrimental to rubber components in pumps, lines, etc. It is preferred that the oil have a gravity within the range of 15°–40° API.

The aqueous drilling fluids of the invention, both the water base drilling fluids and the oil-in-water emulsion drilling fluids, can contain other additives when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

The following examples will further illustrate the invention.

EXAMPLE I

This example is a control which serves to illustrate performance properties, particularly gel strength, of a typical drilling mud. This example also describes the performance tests used to evaluate all of the drilling fluids described herein.

DRILLING FLUID (MUD) PREPARATION

The specific ingredients corresponding to a particular base mud were introduced in the order listed into a 5-gallon plastic bucket equipped with a Arde-Barinco stirrer.

| Base Mud No. 7 | Ingredient | Base Mud No. 23 |
|---|---|---|
| 8,917 grams | Distilled Water | 10,000 grams |
| 460 grams | Bentonite | 657 grams |
| 2,300 grams | P-95, Low Grade Bentonite or | — |
| — | Kaolin Clay, Grade D-6 | 2,630 grams |
| 475.8 grams | Barite | 5,250 grams |

After each ingredient was added, the mix was moderately stirred until dispersion was complete. After all the ingredients were added, the mixture was stirred for an additional 25 minutes, during which time the direction of stirring was reversed several times for better dispersion. The mud was then placed into a 5-gallon plastic jug and allowed to condition overnight at ambient room temperature. To a 1-pint Mason jar was added 280 milliliters of the mud which was then mixed for 1 to 5 minutes with a Hamilton Beach Malt mixer. Any further additives such as thinners, contaminants, etc. were added just before this mix. The mud was transferred to a Multimixer (Sterling Multi Products, Inc.) which can hold up to 5 jars and mixed for 20 minutes, during which time the pH was, if necessary, adjusted to 10.5 by the addition of 33 weight percent aqueous NaOH.

VISCOSITY-PLASTIC VISCOSITY/YIELD POINT

The average viscosity in centipoise (cps) was determined on the mud (or drilling fluid) using a Fann VG Viscometer at 600 rpm. The speed was then changed to 300 rpm and the average viscosity again measured. Plastic viscosity is then defined as the 600 rpm reading minus the 300 rpm reading. Yield point is defined as the 300 rpm reading minus the plastic viscosity.

GEL STRENGTH 10 SEC/10 MIN

While at the 300 rpm during the viscosity measurement, the viscometer speed was reduced to 3 rpm; the viscometer was turned off for 10 minutes after determining the 10 second gel strength, then re-started at 3 re-starting is referred to as the 10 sec. gel strength. The viscometer was turned off for 10 1 minutes after determining the 10 second gel strength, then re-started at 3 rpm; the highest reading attained is referred to as the 10 min. gel strength.

AGING

After the viscosity measurements, the Mason jar with the mud was sealed and placed in an oven at 80° C. for about 16 hours (overnight). The jar was removed, cooled to about room temperature in 2 hours, stirred for 2 minutes on the multimixer and re-tested for the same performance properties as previously described.

CONTAMINANT TESTING

After the aging test, the mud was put on the Hamilton Beach mixer, any contaminant such as cement, gypsum or salt added and the mixture mixed for 20 minutes. The jar was then sealed, aged at 80° C. for 16 hours, cooled to room temperature and tested in the manner previously described.

HIGH TEMPERATURE TESTING

Samples were prepared as previously described under the heading Viscosity-Plastics Viscosity/Yield Point and Gel Strength 10 second/10 minute without any contaminants. After the viscosity measurements, the mud sample was sealed in a Baroid High Temperature brass aging bomb and placed in an oven at 182° C. (360°

F.) for about 16 hours (overnight). The bombs were removed and cooled to room temperature. The high temperature shear strength was determined with a Baroid Shearometer. The mud was transferred to a Mason jar, stirred for 2 minutes on the multimixer and re-tested for the same performance properties as previously described, including high temperatures gel strength.

$MnCl_2$ (Run 11), $NiSnO_3$ (Run 12), $SnCl_2$ (Run 13), and $SnF_2$ (Run 14). Although $NiSnO_3$ did not perform as well as the other materials after aging with contaminants, their performance without contaminants or heat aging was considered satisfactory.

TABLE I

Effect of Additives as
Thinners for Drilling mud Compositions
280 mL Drilling Mud No. 7
3.2 grams Salt
X grams Thinner Additive
pH 10.5

| | Initial Properties Before Aging | | | | Aged Properties after Contaminant was added | | | |
|---|---|---|---|---|---|---|---|---|
| | Visc., cps | | Gel | | Visc., cps | | Gel | |
| Additives | 600 rpm | 300 rpm | 10 sec/ 10 min | PV/YP | 600 rpm | 300 rpm | 10 sec/ 10 min | PV/YP |
| Controls: | | | | | | | | |
| 1. None | 273 | 236 | 171/165 | 37/209 | >300 | >300 | >300 | — |
| 2. (SMQ, 2.8 g + .4 g $Na_2Cr_2O_7$)[a] | 60 | 32 | 3/4 | 28/4 | 125 | 101 | 45/100 | 24/67 |
| 3. SMQ 3.2 g | 65 | 34 | 2/7 | 31/3 | 181 | 151 | 99/116 | 30/14 |
| 4. SMQ 2.8 g + 0.4 g $FeCl_2$ | 67 | 36 | 3/5 | 31/5 | 133 | 165 | 80/107 | 32/101 |
| 5. SMQ 2.8 g + 0.4 g $FeCl_3$ | 67 | 37 | 3/6 | 30/7 | 132 | 160 | 71/96 | 28/4 |
| 6. SMQ 2.8 g + 0.4 g SnO | 61 | 34 | 3/6 | 27/7 | 180 | 151 | 95/118 | 29/122 |
| Invention: | | | | | | | | |
| 7. SMQ 2.8 g + 0.4 g $K_2SnO_3$ | 65 | 32 | 2/3 | 33/−1 | 100 | 68 | 22/77 | 32/66 |
| 8. SMQ 2.8 g + 0.4 g $Sn(BF_4)_2$ | 60 | 32 | 2/3 | 28/4 | 117 | 83 | 37/93 | 34/39 |
| 9. SMQ 2.8 g + 0.4 g $Sn_2P_2O_7$ | 62 | 33 | 3/3 | 29/4 | 91 | 55 | 4/39 | 36/19 |
| 10. SMQ 2.8 g + 0.4 g $SnSO_4$ | 60 | 31 | 2/2 | 29/2 | 90 | 55 | 5/41 | 35/20 |
| 11. SMQ 2.8 g + 0.4 g $MnCl_2$ | 89 | 48 | 3/3 | 41/7 | 192 | 161 | 103/123 | 31/130 |
| 12. SMQ 2.8 g + 0.4 g $NiSnO_3$ | 80 | 44 | 4/9 | 36/8 | 192 | 156 | 98/113 | 36/120 |
| 13. SMQ 2.8 g + 0.4 g $SnCl_2$ | 58 | 30 | 1/2 | 28/2 | 90 | 57 | 6/53 | 31/26 |
| 14. SMQ 2.8 g + 0.4 g $SnF_2$ | 62 | 32 | 3/3 | 30/2 | 76 | 43 | 3/18 | 33/10 |

[a]Desco ®. Phillips Petroleum Co., a 7:1 wt. ratio mixture of sulfomethylated quebracho to $Na_2Cr_2O_7$.
[b]Sulfomethylated quebracho
[c]$SnCl_2.2H_2O$ with a new lot of Base Mud No. 7
[d]4 ppb NaCl contaminant added; aged at 80° C., 16 hours after NaCl added.

EXAMPLE II

This example illustrates the use of certain metal inorganic compounds as additives for thinning drilling fluids. The results are listed in Table I. The basic control system is No. 2 Desco ® thinner, a mixture of 7 parts by weight sulfomethylated quebracho (SMQ) and 1 part by weight $Na_2Cr_2O_7$. The various other metal compounds were tested in combination with similar weight proportions of SMQ to determine the performance of these systems in comparision with the Desco ® system. The property considered to be most important for screening potential thinning agents is gel strength 10 sec/10 min, especially after aging with a contaminant. Thus, SMQ by itself (Run 3) has a good initial gel strength value, 2/7, but when aged with contaminant, the value increases to 99/116, considered unsatisfactory. Several other additives when added to SMQ did not show satisfactory gel strength after aging, such as $FeCl_2$ (Run 4), $FeCl_3$ (Run 5), SnO (Run 6), and $Sn(BF_4)_2$ (Run 8). Several other materials used in SMQ+additive runs suggested some potential as drilling fluid thinners, such as $K_2SnO_3$ (Run 7), $Sn_2P_2O_7$ (Run 9), $SnSO_4$. (Run 10),

EXAMPLE III

This example illustrates the effect of $SnCl_2$ concentration relative to its thinning abilities at high temperature (182° C.). The data listed in Table II indicate the SMQ-$SnCl_2$ blend (Run 4) gives a lower gel strength value, 2/2, than the control SMQ-$Na_2Cr_2O_7$ blend (Desco ®, Run 2). The data also show that the weight ratio of SMQ:$SnCl_2$ can be varied from the standard 7:1 (Run 4) to at least 63:1 (Run 7) without significantly affecting the gel strength value. The data also show an inverse relationship between the amount of $SnCl_2$ used and the gel strength value (Runs 4 through 7). The temperature of aging was increased from the usual 80° C. (Table I) to 182° C. (Table II). In spite of this increased temperature, the SMQ/$SnCl_2$ thinner still performed well. In addition, the data show that shear strength is better at low ratios (e.g. about 7:1 to about 15:1) of SMQ/$SnCl_2$ but it is for all intents and purposes equivalent to the performance of SMQ/$Na_2C_2O_7$ at high ratios of SMQ/$SnCl_2$ (e.g., about 63:1). Thus, this representative tin compound performed at least as well as the control metal compound even when used in concentrations of only one-sixth of that used in the control, with SMQ as the organic material in all cases.

TABLE II

Effect of SnCl$_2$ Concentration on Drilling Mud Gel Formation
280 mL Drilling Mud No. 23

| | | Initial Properties Before Aging | | | | Aged 182°, 16 hours | | |
|---|---|---|---|---|---|---|---|---|
| | Ratio of | Visc., cps | | Gel 10 sec/ | | Shear Strength lbs/100 | Gel 10 sec/ | |
| Additive | SMQ:SnCl$_2$ | 600 rpm | 300 rpm | 10 min | PV/YP | ft$^2$ | 10 min | PV/YP |
| 1. None | — | >300 | >300 | 210/237 | — | 370 | 12/32 | 61/58 |
| 2. (SMQ 2.8 g + 0.4 g Na$_2$Cr$_2$O$_7$)$^a$ | — | 82 | 46 | 2/4 | 36/10 | 270 | 5/9 | 70/94 |
| 3. SMQ$^b$, 3.2 g | — | 91 | 51 | 4/14 | 40/11 | 370 | 12/25 | 77/74 |
| 4. SMQ, 2.8 g + 0.4 g SnCl$_2$$^c$ | 7:1 | 71 | 37 | 1/2 | 34/3 | 210 | 2/2 | 27/19 |
| 5. SMQ, 3.0 g + 0.2 g SnCl$_2$$^c$ | 15:1 | 83 | 44 | 2/3 | 39/5 | 220 | 3/3 | 47/20 |
| 6. SMQ, 3.1 g + 0.1 g SnCl$_2$$^c$ | 31:1 | 80 | 43 | 3/4 | 37/6 | 320 | 4/5 | 62/33 |
| 7. SMQ, 3.15 g + 0.05 g SnCl$_2$$^c$ | 63:1 | 97 | 51 | 3/4 | 46/5 | 270 | 4/7 | 59/34 |

$^a$Desco ® thinner 7 parts by wt. sulfomethylated quebracho:1 part by wt. Na$_2$Cr$_2$O$_7$.
$^b$Sulfomethylated quebracho.
$^c$SnCl$_2$.2H$_2$O

EXAMPLE IV

This example illustrates the effect of contaminants on the properties, particularly gel strength after aging, of SMQ/SnCl$_2$ and SMQ/SnF$_2$ drilling mud thinners. The results in Table III indicate the SMO/SnCl$_2$ thinner (Run 3) has slightly better (i.e., lower) aged gel strength (i.e. 3/7 to 3/2) than the control (Run 1) system in which Na$_2$Cr$_2$O$_7$ is present, where the contaminants salt, cement or gypsum are also present. Using SMQ alone (Run 2), the aged gel value was significantly higher than desired.

The results in Table IV indicate that the SMQ/SnF$_2$ thinner (Run 3) is slightly better as a thinner in the presence of salt, cement, or gypsum contaminants than either the Desco ® thinner control, SMQ/Na$_2$Cr$_2$O$_7$ (Run 1), or SMQ by itself (Run 2), this observation being based primarily on the aged gel strength values. The results in both Tables III and IV indicate that SnCl$_2$ and SnF$_2$, as representative tin compounds, are good metal compounds for use with SMQ, compared with the SMQ/Na$_2$Cr$_2$O$_7$ control. As already mentioned, such combinations have the advantage of avoiding the environmental restrictions imposed upon chromium compounds.

TABLE III

Effect of Contaminants on SMQ/SnCl$_2$ Drilling Mud Thinners
280 mL Drilling Mud No. 23

| | | Initial Properties Before Aging | | | | Aged Properties after Contaminant was added | |
|---|---|---|---|---|---|---|---|
| | | Visc., cps | | Gel | | Gel | |
| Additive | Contaminant | 600 rpm | 300 rpm | 10 sec/10 min | PV/YP | 10 sec/10 min | PV/YP |
| 1. (SMQ, 2.8 g + 0.4 g Na$_2$Cr$_2$O$_7$)$^a$ | Salt, 3.2 g | 129 | 73 | 4/6 | 56/17 | 5/19 | 54/11 |
| | Cement, 1.6 g | 120 | 68 | 3/5 | 52/16 | 3/3 | 73/21 |
| | Gypsum, 1.6 g | 126 | 72 | 5/7 | 54/18 | 4/9 | 71/12 |
| 2. SMQ$^b$, 3.2 g | Salt, 3.2 g | 164 | 98 | 7/16 | 66/12 | 32/88 | 55/86 |
| | Cement, 1.6 g | 132 | 77 | 5/9 | 55/22 | 4/10 | 83/26 |
| | Salt, 1.6 g | 152 | 90 | 5/10 | 62/28 | 20/52 | 60/46 |
| 3. SMQ, 2.8 g + 0.4 g SnCl$_2$$^c$ | Salt, 3.2 g | 110 | 60 | 2/2 | 50/10 | 3/7 | 47/16 |
| | Cement, 1.6 g | 112 | 60 | 2/3 | 52/8 | 3/3 | 78/7 |
| | Gypsum, 1.6 g | 112 | 63 | 2/3 | 19/14 | 3/2 | 68/3 |

$^a$Desco ®, 7 parts by weight sulfomethylated quebracho:1 part by weight Na$_2$Cr$_2$O$_7$
$^b$Sulfomethylated quebracho
$^c$SnCl$_2$.2H$_2$O
$^d$Salt, 4 ppb; cement, gypsum, 2 ppb. Aged 16 hours at 80° C.

TABLE IV

Effect of Contaminants on SMQ/SnF$_2$ Drilling Mud Thinners
280 mL Base Mud No. 23

| | | Initial Properties Before Aging | | | | Aged Properties after Contaminant was Added | |
|---|---|---|---|---|---|---|---|
| | | Visc., cps | | Gel | | Gel | |
| Additive | Contaminant | 600 rpm | 300 rpm | 10 sec/10 min | PV/YP | 10 sec/10 min | PV/YP |
| 1. (SMQ, 2.8 g + 0.4 g Na$_2$Cr$_2$O$_7$)$^a$ | Salt, 3.2 g | 64 | 34 | 2/3 | 30/4 | 5/49 | 46/29 |
| | Cement 1.6 g | 69 | 36 | 2/3 | 33/3 | 2/4 | 50/12 |
| | Gypsum, 1.6 g | 74 | 40 | 2/3 | 34/6 | 5/52 | 43/11 |
| 2. SMQ$^b$, 3.2 g | Salt, 3.2 g | 72 | 39 | 3/7 | 33/6 | 57/167 | 44/68 |
| | Cement, 1.6 g | 74 | 40 | 3/6 | 34/6 | 4/63 | 57/17 |
| | Gypsum, 1.6 g | 85 | 48 | 5/13 | 37/11 | 54/93 | 37/53 |
| 3. SMQ, 2.8 g + 0.4 g SnF$_2$ | Salt, 3.2 g | 64 | 33 | 2/2 | 31/2 | 3/4 | 44/−1 |
| | Cement, 1.6 g | 63 | 33 | 2/2 | 30/3 | 2/3 | 44/3 |

TABLE IV-continued

Effect of Contaminants on SMQ/SnF$_2$ Drilling Mud Thinners
280 mL Base Mud No. 23

| Additive | Contaminant | Initial Properties Before Aging | | | | Aged Properties after Contaminant was Added | |
|---|---|---|---|---|---|---|---|
| | | Visc., cps | | Gel | | Gel | |
| | | 600 rpm | 300 rpm | 10 sec/10 min | PV/YP | 10 sec/10 min | PV/YP |
| | Gypsum, 1.6 g | 65 | 34 | 2/2 | 31/3 | 4/2 | 27/−2 |

[a]Desco ®, 7 Parts by weight sulfomethylated quebracho:1 part by weight Na$_2$Cr$_2$O$_7$
[b]Sulfomethylated quebracho
[c]Salt, 4 ppb; cement, 2 ppb; gypsum, 2 ppb. Aged 16 hours at 80° C.

TABLE V

Comparison of SnF$_2$ and SnSO$_4$ as an Additive to SMQ-Based Drilling Mud Thinners
280 mL Base Mud No. 23

| Additive | Contaminant | Initial Properties Before Aging | | Aged 80° C., 16 hrs. | | |
|---|---|---|---|---|---|---|
| | | Gel 10 sec min | PV/YP | Gel 10 sec/10 min | PV/YP | Shear Strength, pounds/100 ft$^2$ |
| 1. (SMQ 2.8 g + 4 g Na$_2$Cr$_2$O$_7$)[a] (Ratio 7:1) | None | 2/3 | 35/4 | 3/5 | 39/8 | — |
| | Salt | — | — | 7/45 | 45/26 | — |
| | Gypsum | — | — | 4/33 | 37/13 | — |
| | Cement | — | — | 3/4 | 61/10 | — |
| | High Temp. Aging (180° C.) | — | — | 4/7 | — | 538 |
| 2. SMQ[b] 2.8 g + 0.4 g SnF$_2$ (Ratio 7:1) | None | 2/2 | 34/3 | 2/2 | 37/1 | — |
| | Salt | — | — | 3/4 | 39/4 | — |
| | Gypsum | — | — | 2/2 | 43/5 | — |
| | Cement | — | — | 2/2 | 48/3 | — |
| | High Temp. Aging (182° C.) | — | — | 2/2 | — | 170 |
| 3. SMQ 3.1 g + 0.1 g SnF$_2$ (Ratio 31:1) | None | 2/3 | 38/5 | 3/21 | 42/5 | |
| | Salt | — | — | 8/43 | 47/5 | |
| | Gypsum | — | — | 3/22 | 50/3 | |
| | Cement | — | — | 3/7 | 49/9 | |
| | High Temp. Aging (182° C.) | — | — | 4/5 | — | 425 |
| 4. SMQ 2.8 g + 0.4 g SnSO$_4$ (Ratio 7:1) | None | 2/2 | 38/0 | 2/2 | 34/3 | |
| | Salt | — | — | 3/7 | 41/9 | |
| | Gypsum | — | — | 2/4 | 42/2 | |
| | Cement | — | — | 2/4 | 59/6 | |
| | High Temp. Aging (182° C.) | — | — | 2/2 | — | 195 |
| 5. SMQ 3.1 g + 0.1 g SnSO$_4$ (Ratio 31:1) | None | 2/4 | 39/5 | 3/4 | 43/7 | |
| | Salt | — | — | 13/65 | 63/55 | |
| | Gypsum | — | — | 5/37 | 45/17 | |
| | Cement | — | — | 3/20 | 78/16 | |
| | High Temp. Aging | — | — | 3/4 | — | 370 |

[a]Desco ®, Phillips Petroleum Co.
[b]Sulfomethylated quebracho

EXAMPLE V

This example compares the effectiveness of SnSO$_4$ to SnF$_2$ and Na$_2$Cr$_2$O$_7$ when each is combined with SMQ as a drilling mud thinner, particularly in the presence of contaminants. These results, which are listed in Table V, indicate that at a 7:1 ratio of SMQ-to-additive, SnSO$_4$ (Run 4) is comparable to SnF$_2$ (Run 2), both of which are better in aged gel performance, i.e. give lower gel values, than the control using Na$_2$Cr$_2$O$_7$ (Run 1). The data also show that reducing the amount of SnF$_2$ or SnSO$_4$ normally used (i.e. the 7:1 SMQ-to-additive ratio) does not greatly alter the aged gel value. For example, the weight ratio of SMQ:SnF$_2$ or SMQ:SnSO$_4$ can be increased to 31:1 (Runs 3 and 5) and the aged gel value still remains at a satisfactory low level even though contaminants such as salt, cement, or gypsum are present.

This table also shows that either a 7:1 or 31:1 ratio of SMQ-to-metal additive provides good thermal stability as evidenced by the shear strength and gel strength values after aging without contaminants at high temperature, 183° C. Although the shear strength at the lower ratios of SMQ-to-additive (7:1) are better than those at the higher ratios (31:1), the shear strength after heat aging of all the SMQ-additive mixtures are substantially better (lower) than those obtained with the control, run 1.

EXAMPLE VI

This example illustrates that in an SMQ/SnSO$_4$ composition used as a thinner for a drilling mud, a portion of the SMQ can be replaced with a lignite (tannathin) and still maintain good, or even improved properties. That is, in a thinner with an equivalent amount of organic material, the lignite is used in place of a portion of the SMQ in the standard preparation. These results listed in Table VI show that replacing 50 weight percent of the SMQ with lignite (run 4) gives a significant improvement in the PV/YP and gel strength properties, particularly when contaminants are present, compared to when no lignite is used (run 3) or even when a standard chromium-based SMQ thinner is employed (run 2). The data also show that even when 68 weight percent (run 5) or 81 weight percent (run 6) of the SMQ is replaced with a lignite, the performance properties are for the most part as good as or better than those using only SMQ/SnSO$_4$ (run 3) or the standard chromium-based SMQ (run 2). The data indicate a synergistic effect with SMQ and lignite in a SnSO$_4$-based composition. In addition to these improvements in drilling mud properties, the use of lignite is advantageous because of its lower cost.

TABLE VI

Effect of Combination of SMQ with Lignite on SnSO$_4$-Based Mud

| | 1 | 2 | 3 | 4 | 5 | 6 |
|---|---|---|---|---|---|---|
| A. Composition | | | | | | |
| Base Mud 23 | 280 mL | 280 mL | 280 mL | 280 mL | 280 mL | 280 mL |
| Desco ®[a], grams | — | 32 | — | — | — | — |
| SMQ, grams | — | — | 3.1 | 1.55 | 1.0 | 0.6 |
| SnSO$^4$, grams | — | — | .1 | .1 | .1 | .1 |
| Tannathin ®[b], grams | — | — | — | 1.55 | 2.1 | 2.5 |
| B. Properties | | | | | | |
| 1. Initial | | | | | | |
| PV/YP | — | 38/6 | 39/5 | 37/8 | 43/7 | 39/6 |
| Gel, 10 secs/10 mins | 210/237 | 3/4 | 2/4 | 2/3 | 2/2 | 2/3 |
| 2. Aged, 80° C., 16 hrs. | | | | | | |
| PV/YP | — | 37/8 | 43/7 | 35/6 | 39/9 | 39/6 |
| Gel, 10 secs/10 mins | — | 3/5 | 3/4 | 3/3 | 2/2 | 2/2 |
| 3. Aged, 80° C., 16 hrs with Contaminants | | | | | | |
| a. Salt, 4 ppb | | | | | | |
| PV/YP | — | 40/38 | 63/55 | 41/27 | 50/37 | 50/34 |
| Gel, 10 secs/10 mins | — | 14/71 | 13/65 | 4/30 | 7/47 | 6/50 |
| b. Gypsum, 2 ppb | | | | | | |
| PV/YP | — | 41/18 | 45/17 | 42/24 | 29/13 | 33/24 |
| Gel, 10 secs/10 mins | — | 7/53 | 5/37 | 3/40 | 5/33 | 9/51 |
| c. Cement, 2 ppb | | | | | | |
| PV/YP | — | 65/10 | 78/16 | 52/7 | 66/7 | 66/5 |
| Gel, 10 secs/10 mins | — | 3/6 | 3/20 | 2/11 | 3/14 | 2/11 |
| 4. Aged 360° F./16 hrs No Contaminates | | | | | | |
| PV/YP | 61/58 | 70/48 | — | 49/15 | 59/31 | 50/18 |
| Gel, 10 secs/10 mins | 12/32 | 4/7 | 3/4 | 2/3 | 3/4 | 3/4 |

[a]Phillips Petroleum Co., 7 parts SMQ:1 part Na$_2$Cr$_2$O$_7$
[b]Tannathin ® lignite

EXAMPLE VII

This example illustrates that in a SMQ/SnSO$_4$ composition used as a thinner for a drilling mud, combining a portion of the SnSO$_4$ with a Mn compound improves the thinner in that the drilling fluid has even less tendency to gel, even in the presence of a salt contaminant. These results are listed in Table VII, and show that effectively replacing 25 to 75 weight percent of the SnSO$_4$ with MnCl$_2$ (Runs 2, 3, 4) results in a reduction in at least one of the properties viscosity, PV/YP, and gel strength, particularly after aging at elevated temperature, 80° C. for 16 hours. Even more important is that such an improvement is shown after aging in the presence of a salt contaminant. In other words, with the total amount of metal compound additive held constant, the use of increasing amounts of the Mn compound with a tin compound produces improved properties in the drilling mud.

TABLE VII

Effect of Mn and Sn Compounds on Drilling Mud Gel Formation

| | Invention | | | |
|---|---|---|---|---|
| | 1 | 2 | 3 | 4 |
| A. Composition | | | | |
| Base Mud 23 | 280 mL | 280 mL | 280 mL | 280 mL |
| SMQ, grams | 3.1 | 2.8 | 2.8 | 2.8 |
| SnSO$_4$, grams | 0.1 | 0.3 | 0.2 | 0.1 |
| MnCl$_2$, grams | — | 0.1 | 0.2 | 0.3 |
| B. Properties | | | | |
| 1. Initial | | | | |
| Visc., cps. 600 rpm | 103 | 91 | 87 | 85 |
| 300 rpm | 56 | 49 | 47 | 46 |
| PV/YP | 47/9 | 42/7 | 40/7 | 39/7 |
| Gel, 10 secs/10 mins | 3/4 | 3/3 | 3/3 | 2/3 |
| 2. Aged 80° C., 16 hrs. | | | | |
| Visc., cps. 600 rpm | 140 | 107 | 107 | 107 |
| 300 rpm | 79 | 59 | 58 | 60 |
| PV/YP | 61/18 | 48/11 | 49/9 | 47/13 |
| Gel, 10 secs/10 mins | 4/7 | 3/3 | 3/3 | 3/4 |
| 3. Aged 80° C., 16 hrs. with 4 ppb salt contaminant | | | | |
| Visc., cps. 600 rpm | 209 | 182 | 190 | 179 |
| 300 rpm | 146 | 120 | 125 | 120 |
| PV/YP | 63/83 | 62/58 | 65/60 | 59/61 |
| Gel, 10 secs/10 mins | 27/76 | 5/30 | 7/40 | 10/70 |

EXAMPLE VIII

This example illustrates that a tin compound can be added to a sulfomethylated quebracho thinner which is already combined with a compound of a heavy metal like chromium (e.g. Na$_2$Cr$_2$O$_7$) and still improve the thinning ability in a drilling mud. Those results, listed in Table VIII, show a significant improvement in performance properties when SnF$_2$ is added to a SMQ/Na$_2$Cr$_2$O$_7$ system (run 4) even though a chromium compound is present in the system. The data indicate an improvement with $SnF_2$ in a $SMQ-Na_2Cr_2O_7$ system (Run 4) almost as good as when $SnF_2$ is added to a Cr-free SMQ system (Run 2), and properties significantly better than the all Cr-based control system (Run 3).

TABLE VIII

| Effect of $SnF_2$ on a Cr-Based SMQ Thinner in a Drilling Mud | | | | |
|---|---|---|---|---|
| | 1 | 2 | 3 | 4 |
| A. Composition | | | | |
| Base-Mud 23 | 280 mL | 280 mL | 280 ml | 280 mL |
| Desco ®[a], grams | — | — | 3.2 | 3.1 |
| SMQ, grams | 3.2 | 3.1 | — | — |
| $SnF_2$, grams | — | 0.1 | — | 0.1 |
| B. Properties | | | | |
| 1. Initial | | | | |
| a. Viscosity, | | | | |
| 600 rpm | 91 | — | 82 | 77 |
| 300 rpm | 52 | — | 45 | 41 |
| b. PV/YP | 38/14 | 38/5 | 37/8 | 36/5 |
| c. Gel, 10 secs/ 10 mins | 4/19 | 2/3 | 3/5 | 2/3 |
| 2. Aged 80° C./16 hrs No Contaminant | | | | |
| a. Viscosity, | | | | |
| 600 rpm | 107 | — | 109 | 87 |
| 300 rpm | 67 | — | 61 | 47 |
| b. PV/YP | 40/27 | 42/5 | 48/13 | 40/7 |
| c. Gel, 10 secs/ 10 mins | 13/44 | 3/21 | 4/6 | 3/3 |
| 3. Aged 80° C./16 hrs with Salt (4 ppb) Added | | | | |
| a. Viscosity, | | | | |
| 600 rpm | 183 | — | 168 | 146 |
| 300 rpm | 138 | — | 113 | 90 |
| b. PV/YP | 45/93 | 47/5 | 55/58 | 56/34 |
| c. Gel, 10 secs/ 10 mins | 60/122 | 8/43 | 11/54 | 5/16 |

[a]Phillips Petroleum Co., 7 parts SMQ:1 part $Na_2Cr_2O_7$

EXAMPLE IX

This example demonstrates the effectiveness of $SnSO_4$ as a drilling mud thinner when field tested at an offshore well site under actual field conditions. Before adding the materials to the well mud a pilot test was made by adding 0.1 pounds per barrel $SnSO_4$ to a 3.5 pounds per barrel excess lime base mud comprised of Bentonite, caustic soda, lignite, SMQ, carboxymethyl cellulose (Drispac®), lime, barite and fresh water, which was made up at the well site. The sample was prepared in a manner similar to that previously described and the results compared to those of the base mud without the $SnSO_4$. These results, listed in Table IX, indicate the $SnSO_4$ does indeed improve the initial base and properties as well as properties when the samples were aged (hot rolled) 16 hours at 121° C. (250° F.).

The spread in properties between the base mud and $SnSO_4$-treated mud after heat aging would have been even greater if the test temperatures had been the same, since viscosity parameters generally decrease as temperature increases. However, because of equipment and time limits, this was impractical.

TABLE IX

| | Effect of $SnSO_4$ as a Base Mud Thinner | | | | |
|---|---|---|---|---|---|
| Composition | Viscosity, cps., 600 rpm | Gel 10 sec/ 10 min | PV/YP | pH | Test Temp., °F. |
| A. Initial Properties (Before Aging) | | | | | |
| 1. Base Mud | 24.5 | 2/4 | 19/11 | 13 | 1/6 |
| 2. Base Mud + 0.01 lb/bbl $SnSO_4$ | 21 | 1/3 | 17/8 | 13 | 1/6 |
| B. After Aging (Hot Rolled) 16 hrs/250° F. | | | | | |
| 1. Base Mud | 58 | 11/15 | 34/48 | 12.4 | 120 |
| 2. Base Mud + 0.01 lb/bbl $SnSO_4$ | 52 | 4/10 | 34/36 | 12.5 | 94 |

Based on the above pilot test results, the $SnSO_4$ thinner was evaluated in a mud used during actual drilling operations. A 0.05 weight percent aqueous $SnSO_4$ solution was first prepared by dissolving 20 pounds of $SnSO_4$ in 50 gallons of water and running 80 pounds of the mixture into a 1300 barrel mud system. This equals about 0.06 pounds per barrel $SnSO_4$. The treated mud was pumped into the well and came back from the well with reduced viscosity compared to when the $SnSO_4$ solution was not used. Normally, mud without the $SnSO_4$ additive enters the well with a funnel viscosity of about 45 seconds per quart and comes out of the well with a funnel viscosity of about 54 to 58 seconds per quart, the flow line temperature averaging 150° F. with a bottom hole static temperature of about 270° F. With the $SnSO_4$-treated mud, the funnel viscosity of the exiting mud declined from 54–58 seconds per quart viscosity level until at one time it was 39 seconds per quart, which illustrates the effectiveness of $SnSO_4$ in reducing viscosity properties under actual drilling conditions.

The above examples, while in the form of tests, show the comparative efficiencies of the various additive agents enumerated, thereby enabling those skilled in the art to employ these agents in those cases where the consistency of a drilling fluid is to be controlled as to viscosity, gel strength, etc. In the treatment of a drilling fluid in accordance with modern practice, such agents are not employed haphazard, but a preliminary test is made at the well to determine the effectiveness of an agent and the percentages to be employed. The driller will then be guided during the course of drilling to add such amounts of the agents as are necessary.

In the actual treatment of a drilling fluid, the procedure is not of course one of using a given proportion or percentage of the treating agents with reference to the drilling fluids, for the treatment is one of adjusting the consistency of the drilling fluid by the addition of the treating agents. This will be apparent when we consider the fact that during the course of drilling a formation which may contain salts, cement or cuttings, generally the viscosity will be affected by the addition of these formation agents. The water used in the making of the drilling fluid, the temperature of the bottom of the well, and other conditions also affect the viscosity of the drilling fluid. Moreover, drilling fluid may be overtreated by the previous additions of various agents. As a result, the specification of any particular percentage of an additive agent, with reference to the weight or volume of the drilling fluid, is essentially meaningless. The practical procedure, therefore, is to add the agents in accordance with the requirements in order to secure the desired consistency, viz., viscosity, gel strength, etc., in accordance with the practice at any particular well.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An aqueous drilling fluid comprising water, finely divided solids and a first agent comprising a sulfoalkylated tannin containing no complexing heavy metal and a second agent comprising at least one at least partly water-soluble metal compound comprising tin, wherein the weight ratio of said first agent to said second agent is in the range from about 100:1 to about 1:1.

2. A drilling fluid in accordance with claim 1 wherein said first agent comprises a sulfoalkylated tannin selected from the group consisting of gallotannin and flavotannin.

3. A drilling fluid in accordance with claim 2, wherein said tin compound is an inorganic compound of tin.

4. A drilling fluid in accordance with claim 3, wherein said inorganic tin compound is selected from the group consisting of tin halide, tin sulfate, tin nitrate and tin phosphate.

5. A drilling fluid in accordance with claim 3, wherein said tin compound is selected from the group consisting of stannous fluoride, stannous sulfate, and stannous pyrophosphate.

6. A drilling fluid in accordance with claim 2 wherein said second agent further comprises at least one at least partly water-soluble nickel compound.

7. A drilling fluid in accordance with claim 6 wherein said second agent further comprises $NiSnO_3$.

8. A drilling fluid in accordance with claim 6 wherein said second agent further comprises at least one manganese compound in a quantity such that the proportion of Mn to Sn by weight in said second agent is in the range of from about 10:90 to about 90:10.

9. A drilling fluid in accordance with claim 1 wherein the weight ratio of said first agent to said second agent is in the range from about 40:1 to about 5:1.

10. A drilling fluid in accordance with claim 5 wherein the weight ratio of said first agent to said second agent is in the range of from about 70:1 to 2:1.

11. A drilling fluid in accordance with claim 10 wherein said sulfoalkylated tannin comprises sulfomethylated quebracho.

12. A drilling fluid additive comprising a mixture of: a first agent selected from the group consisting of a sulfoalkylated tannin containing no complexing heavy metal and a second agent comprising at least one at least partially water soluble compound of tin, wherein the weight ratio of said first agent to said second agent is in the range from about 100:1 to about 1:1.

13. A drilling fluid additive in accordance with claim 12 wherein said sulfoalkylated tannin comprises sulfomethylated quebracho.

14. A drilling fluid additive in accordance with claim 13 wherein said second agent further comprises at least one at least partly water-soluble nickel compound.

15. In a process for the drilling of a well with well drilling tools wherein a drilling fluid is circulated in said well in contact with the wall thereof, the improvement comprising circulating in said well as said drilling fluid an aqueous drilling fluid comprising water and sufficient finely divided solids to form a filter cake on the wall of the well, to which drilling fluid there has been added a first agent consisting essentially of a sulfoalkylated tannin and a second agent comprising at least one at least partially water-soluble metal compound containing tin, wherein the weight ratio of said first agent to said second agent is in the range from about 100:1 to about 1:1; wherein the total amount of said first agent and said second agent added to said drilling fluid are effective to reduce at least one of
  (a) the plastic viscosity,
  (b) the yield point,
  (c) the 10-monute gel strength, and
  (d) the high temperature gell strength and shear strength of said drilling fluid.

16. A process in accordance with claim 15 wherein said sulfoalkylated tannin is sulfomethylated quebracho and the metal compound containing tin comprises stannous fluoride or stannous sulfide.

17. A process in accordance with claim 16 wherein said second agent further comprises at least one at least partly water-soluble compound.

* * * * *